US007918613B2

(12) United States Patent
Wang et al.

(10) Patent No.: US 7,918,613 B2
(45) Date of Patent: Apr. 5, 2011

(54) SWITCHING MECHANISM FOR CAMERA

(75) Inventors: Tai-Kuo Wang, Taipei (TW); Wen-Chi Wang, Taipei (TW); Julian Lin, Taipei (TW)

(73) Assignee: VTC Electronics Corporation, Taipei (TW)

( * ) Notice: Subject to any disclaimer, the term of this patent is extended or adjusted under 35 U.S.C. 154(b) by 0 days.

(21) Appl. No.: 12/491,302

(22) Filed: Jun. 25, 2009

(65) Prior Publication Data

US 2010/0328796 A1    Dec. 30, 2010

(51) Int. Cl.
*G03B 7/00*    (2006.01)
*G03B 1/00*    (2006.01)

(52) U.S. Cl. ........................................ 396/411; 396/241

(58) Field of Classification Search .................. 396/241, 396/411, 439; 348/342
See application file for complete search history.

(56) References Cited

U.S. PATENT DOCUMENTS 6,137,958 A * 10/2000 Toyoda ............................ 396/65
2009/0244355 A1* 10/2009 Horie ............................ 348/340

* cited by examiner

*Primary Examiner* — Rodney E Fuller
(74) *Attorney, Agent, or Firm* — Roger H. Chu

(57) ABSTRACT

A switching mechanism for a camera includes: a control unit; a driving device coupled with and actuated by the control unit; a first gear set coupled with the driving device; a second gear coupled with the first gear set and centrally provided with a rotary shaft having a shaft hole formed with threads; a spindle being female-connected to the shaft hole and which has an axial surface formed with outer threads corresponding to the threads of the shaft hole, thus allowing the second gear to move along and relative to the spindle; and a translation member positioned perpendicular to the spindle and provided with a rack for engaging with the second gear and thus driving the translation member to move perpendicular to the spindle. The second gear drives or does not drive the rack as the engagement therebetween is made or broken.

7 Claims, 5 Drawing Sheets

SWITCHING MECHANISM FOR CAMERA

BACKGROUND OF THE INVENTION

1. Technical Field

The present invention relates to switching mechanisms applicable to cameras. More particularly, the present invention relates to a structurally simple, low-noise, and low wear-and-tear mechanism for switching the filters of a camera without using complex control and feedback units.

2. Description of Related Art

For a general camera equipped with a CCD or CMOS sensing element to maintain a satisfactory image-capturing state in the daytime as well as at night, it is necessary to switch filters for diurnal and nocturnal use of the camera respectively so that high image fidelity is achieved in the daytime, and clear pictures can be taken during the nighttime. Therefore, filter-switching mechanisms are commonly provided in cameras.

A variety of filter-switching mechanisms are now available on the market. These mechanisms can be divided, by the control methods involved, into the following two types.

The "closed-circuit control mechanisms" are the most basic and popular automatic switching mechanisms. In such a mechanism, be it used in a mechanical, electronic, or optical device, sensors are provided at a starting point and a terminal point of the switching operation so as to detect the object being switched and feed back electronic signals to a control chip, which then actuates or stops a driving device (usually a motor) accordingly, thereby realizing the desired switching function. When the object driven by the motor reaches a predetermined position or condition, a signal is fed back to the control chip so as to adjust the operation of the motor. While this control method monitors the conditions of the object being switched and provides reliable control over the object, it is nevertheless disadvantaged by high costs and bulky design.

On the other hand, in an "open-circuit control mechanism", an input unit provides one-way positive control over a motor so that the motor drives an object without detecting its conditions. Mechanisms of this type are advantageously simple and economical because no special controllers and feedback mechanisms are required. However, since there are no position sensing devices (e.g., switches and sensors) for detecting the conditions of the driven object, once the object is blocked from moving but the driving device (e.g., a motor) is not timely stopped, components along the driving link, such as the motor or a transmission mechanism (most probably the motor), will be damaged. Therefore, in order to protect the components, it is necessary to incorporate into the control mechanism a mechanism for making and breaking the connection between the driven object and the driving device. One of the most popular solutions involves providing control by frictional constraint. While this friction-based solution is mechanically simple and economical, it has such inherent and unconquerable defects as blindness toward the conditions of the driven object and significant operational noise.

Thus, there is a need for a novel switching mechanism that is applicable to cameras and capable of eliminating all the above problems.

BRIEF SUMMARY OF THE INVENTION

In view of the aforementioned need, the inventor of the present invention contemplated, from the perspective of design, on ways to maximize the advantages of the existing open-circuit control mechanisms and overcome their defects such as low stability and significant operational noise, so as to enhance the quality and competitiveness of products using such mechanisms. According to the concept of the present invention, a gear mechanism capable of both rotation and translation is positioned perpendicular to a translation member such that the gear mechanism capable of rotation and translation is engageable with a rack of the translation member so as to drive the translation member to move, thus forming a highly stable, low-noise open-circuit control mechanism that is conveniently applicable to various systems.

The first objective of the present invention is to provide a switching mechanism for a camera, wherein the switching mechanism is capable of actuating reciprocating motions within a specific interval without the assistance of feedback signals so as to realize an automatic switching function of the camera, and wherein the switching mechanism features a simple structure, low noise, low wear and tear, and economy of space and cost and works without complex control and feedback units.

The second objective of the present invention is to provide a switching mechanism for a camera, wherein components of the switching mechanism are easy to design and highly applicable. Beside, by virtue of a common and frequently used mechanism design, the components of the switching mechanism are easily adjustable in position by making and breaking an engagement between the components, thus effectively preventing vibration, noise, and wear which may otherwise result from friction between the components.

In order to achieve the above and other objectives, the present invention provides a switching mechanism for a camera, wherein the switching mechanism includes: a control unit; a driving device coupled with the control unit so as to be actuated thereby; a first gear set coupled with the driving device; a second gear coupled with the first gear set, wherein the second gear is centrally and fixedly provided with a rotary shaft that has a shaft hole formed with a plurality of threads; a spindle being female-connected to the shaft hole of the second gear and which has an axial surface formed with a plurality of outer threads corresponding to the threads of the shaft hole so that the second gear is movable along the spindle; and a translation member positioned perpendicular to the spindle and provided with rack for engaging with the second gear.

Therein, the driving device, when actuated by the control unit, drives the first gear set. The first gear set then threadingly drives the second gear not only to rotate, but also to translate linearly along and relative to the spindle as the threads formed on the shaft hole of the rotary shaft of the second gear match with the outer threads formed on the surface of the spindle. Through proper spatial arrangement, the second gear, once moved to a first predetermined position along the spindle, engages with the rack of the translation member so that the rack drives the translation member to move perpendicular to the spindle. When further moved to a second predetermined position along the spindle, the second gear is disengaged from the rack of the translation member so that the translation member stops moving.

BRIEF DESCRIPTION OF THE SEVERAL VIEWS OF THE DRAWINGS

The invention as well as a preferred mode of use, further objectives, and advantages thereof will be best understood by referring to the following detailed description of an illustrative embodiment in conjunction with the accompanying drawings, wherein.

DETAILED DESCRIPTION OF THE INVENTION

Before the present invention is described in detail, the basic principle of the present invention is briefly stated. Please refer to FIG. 1 for various principles for achieving reciprocating motions within a predetermined interval between points A and B, wherein the horizontal solid lines represent stable connections between driving units and the corresponding driven units, the horizontal dotted lines represent unstable connections between the driving unit and the corresponding driven unit, and the vertical dashed lines indicate corresponding positions along a direction of linear motion. A mechanism capable of such reciprocating motions can be used to convey an object back and forth or serve directly as a switching mechanism. In order to express the motion of a driving unit (e.g., a motor), S denotes a starting point of energy input, and E denotes a terminal point of the energy input. The entire process is controlled by the operation time of the driving unit.

Figure 1:
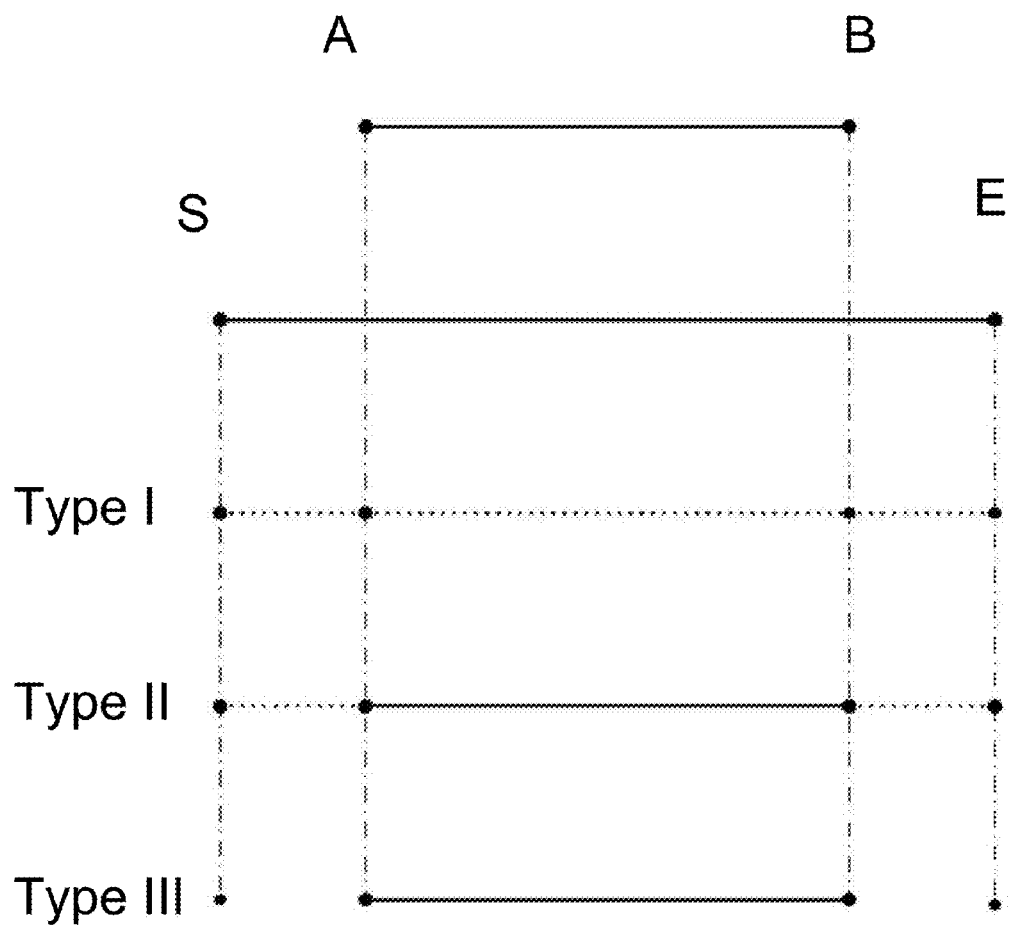
FIG. 1 illustrates various principles for achieving reciprocating motions within a predetermined interval, wherein "Type III" is adopted in a switching mechanism for a camera according to the present invention.

As shown in FIG. 1, there are three alternative principles for enabling reciprocating motions of a driven unit without using feedback control elements. The three principles are referred to as "Type I", "Type II", and "Type III" in the following description.

"Type I" refers to a connection between driving and driven units that is breakable at any time during operation, as indicated by the horizontal dotted lines in the drawing. In this type of connection, the driven unit will be retained at a specific position, such as points A and B in the drawing, whenever a constraining factor based on resilience or friction is applied to the driven unit. However, since the "Type I" connection works on an unstable kinematic relation between the driving and driven units, it suffers from unintentional detachment, frictional noise, and frictional wear, among other problems, and in consequence the service life of the entire mechanism is reduced.

In the "Type II" connection, while the driving and driven units are constantly connected to each other during operation, the driven unit is completely constrained by the driving unit within a specific interval, as indicated by the horizontal solid lines in the drawing. Therefore, when the driven unit is moved in the interval between points A and B, it is under total control of the driving unit, and a highly reliable motion control mechanism is thus achieved.

In the "Type III" connection, which provides the most precise control among the three types, the driving unit is connected with the driven unit only when the driven unit needs to be driven, thus eliminating the problems related to unstable connection. The "Type III" connection incorporates the advantages of "Type I" and "Type II" and is adopted as the fundamental design principle of the present invention.

In order to provide, under the premise that no feedback control elements are required, a mechanism capable of reciprocating motions within a predetermined interval, the inventor of the present invention uses a first gear set, a second gear, and a spindle of the second gear as driving units, and a translation member provided with a rack, as a driven unit, wherein the driving and driven units are arranged in a particular vertical configuration so that the aforesaid objectives of the present invention are achieved through engagement and disengagement between the rack and the second gear. The concept of the present invention is hereinafter demonstrated with a preferred embodiment, which is now described in detail in conjunction with the accompanying drawings.

Figure 2A:
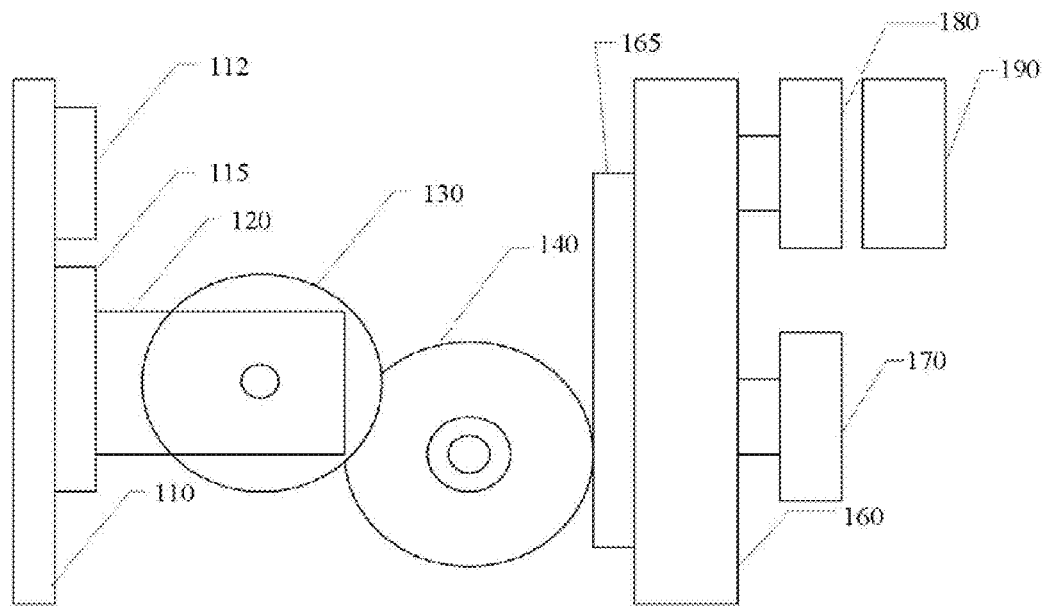
FIGS. 2A and 2B are front and top views of a switching mechanism for a camera according to a preferred embodiment of the present invention.
Figure 2B:
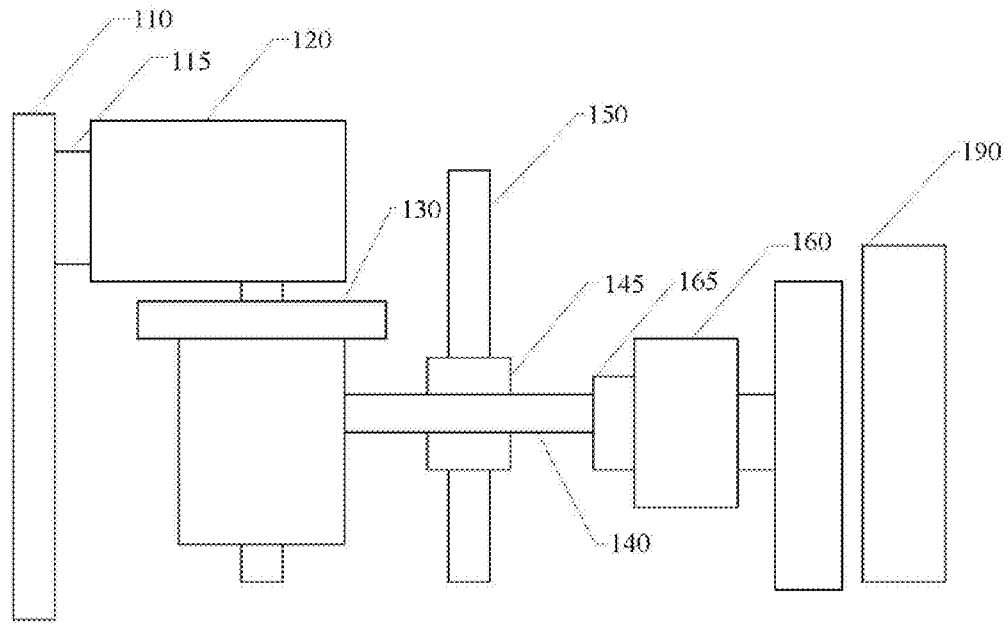

FIGS. 2A and 2B are front and top views of a switching mechanism for a camera according to the preferred embodiment of the present invention. As shown in the drawings, the switching mechanism comprises: a printed circuit board 110; an image capture device 112 and a control unit 115 which are both mounted on the printed circuit board 110; a driving device (e.g., a drive motor) 120 which is coupled with and actuated by the control unit 115; a first gear set 130 which is coupled with the driving device 120 and driven thereby to rotate; a second gear 140 which is coupled with the first gear set 130 and is centrally and fixedly provided with a rotary shaft 145, wherein the rotary shaft 145 has a shaft hole whose surface is formed with a plurality of threads (not shown); a spindle 150 female-connected to the shaft hole of the rotary shaft 145 of the second gear 140, wherein the spindle 150 has an axial surface formed with a plurality of outer threads (not shown) corresponding to the threads of the shaft hole of the rotary shaft 145 so that the second gear 140 is movable along the spindle 150; and a translation member 160 which is positioned perpendicular to the spindle 150 and provided with a rack 165 for engaging with the second gear 140, wherein the translation member 160 is further coupled with a glass plate 170 and a filter 180 while a lens 190 is disposed in front of the filter 180.

When actuated by the control unit 115, the drive motor 120 drives the first gear set 130 to rotate. Then, the first gear set 130 threadingly drives the second gear 140 to rotate as well as to move linearly along the spindle 150 as the threads of the shaft hole of the rotary shaft 145 of the second gear 140 match with the outer threads on the surface of the spindle 150. With proper spatial arrangement, the second gear 140, when moved to a first predetermined position along the spindle 150, contacts and then engages with the rack 165 of the translation member 160, thus driving the rack 165 to move linearly and perpendicularly to the spindle 150. As a result, the rack 165 drives the translation member 160 to move along. When the second gear 140 is further moved to a second predetermined position along the spindle 150, the second gear 140 is disengaged from the rack 165 of the translation member 160 so that the rack 165 stops moving, and in consequence the translation member 160 stops moving, too.

As the translation member 160 is coupled with the filter 180 and the glass plate 170, when the translation member 160 is driven by the rack 165 to move, the filter 180 and the glass plate 170 are also moved linearly with the translation member 160 so as to be adjusted to specific positions. The image capture device 112 coupled with the printed circuit board 110 can be either a CCD sending element or a CMOS sensing element.

A more detailed description by stages of how the driving units (i.e., the drive motor 120, the first gear set 130, the second gear 140, and the spindle 150) drive the driven unit (i.e., the translation member 160) for linear translation is now provided by reference to FIGS. 3A, 3B, 4A, 4B 5A, and 5B, which show pairs of corresponding front and top views of the switching mechanism for a camera according to the preferred embodiment of the present invention.

Figure 3A:
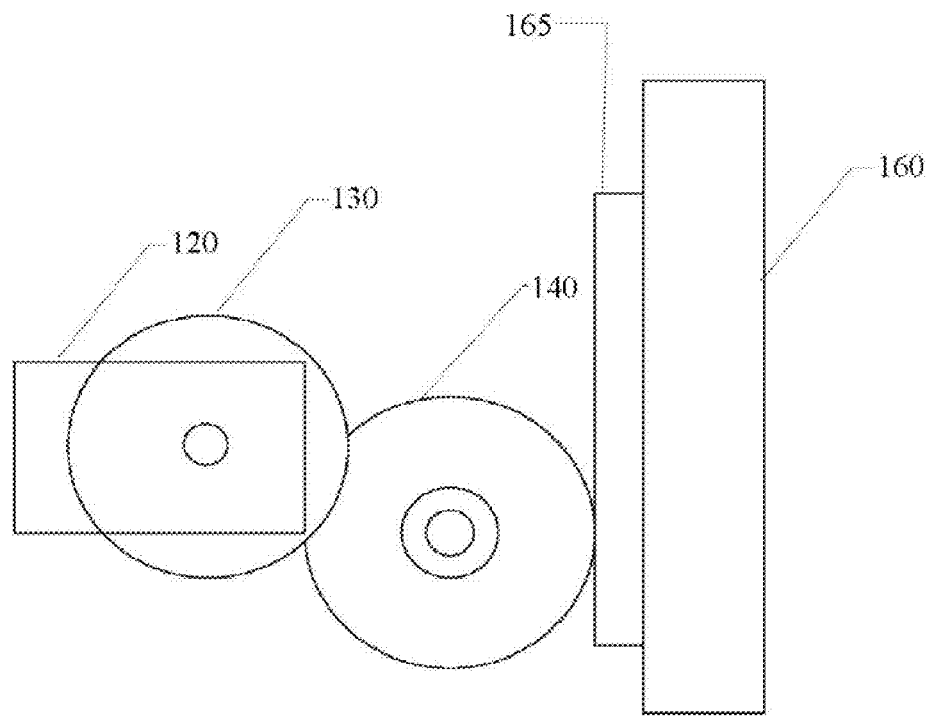
FIGS. 3A, 3B, 4A, 4B, 5A, and 5B are pairs of corresponding front and top views showing operation of some components of the switching mechanism according to the preferred embodiment of the present invention.
Figure 3B:
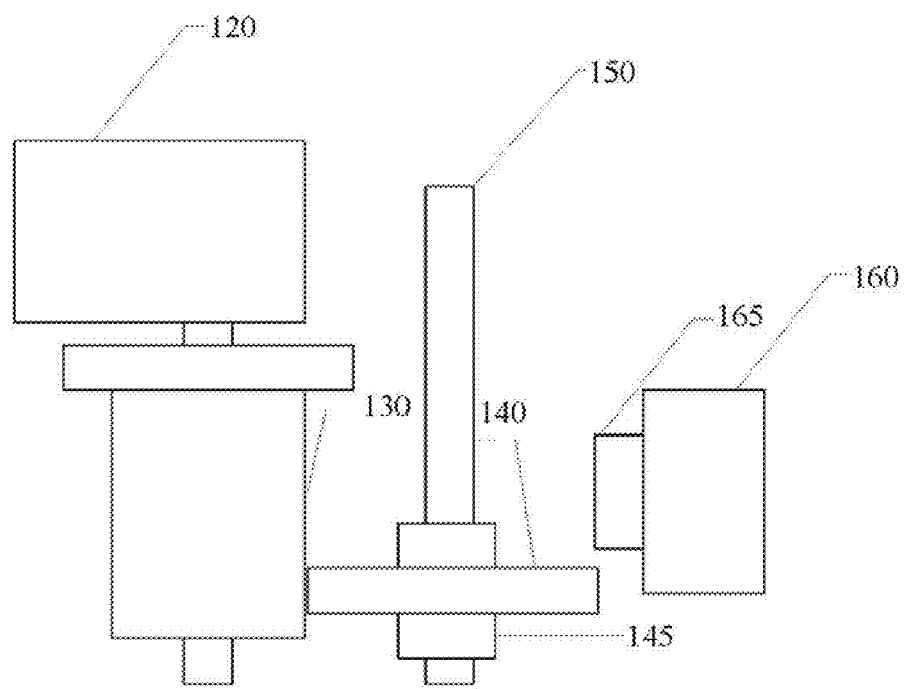

To begin with, as shown in FIGS. 3A and 3B, the drive motor 120 is activated by voltage input from the control unit 115 and drives the first gear set 130 to rotate. The second gear 140, which is coupled with the first gear set 130 and capable of both rotation and translation, is therefore driven threadingly by the first gear set 130 to rotate with the first gear set 130. Meanwhile, the rotary shaft 145 centrally and fixedly provided on the second gear 140 also rotates with the first gear set 130. Since the shaft hole of the rotary shaft 145 of the second gear 140 is female-connected to the spindle 150, and the threads of the shaft hole of the rotary shaft 145 of the second gear 140 correspond to the outer threads on the surface of the spindle 150, the second gear 140 is driven via the matching of the threads to move linearly along and relative to the spindle 150. At this stage, the rack 165 of the translation member 160 is not engaged with the second gear 140 so that the rack 165 does not move perpendicular to the spindle 150. In consequence, the translation member 160 is also not driven to move.

Figure 4A:
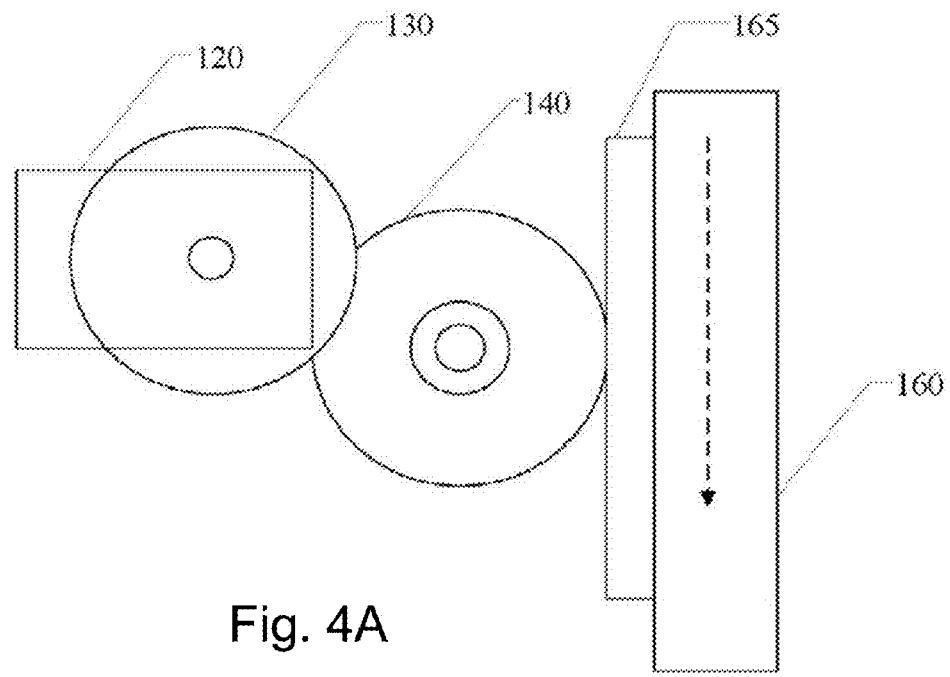
Figure 4B:
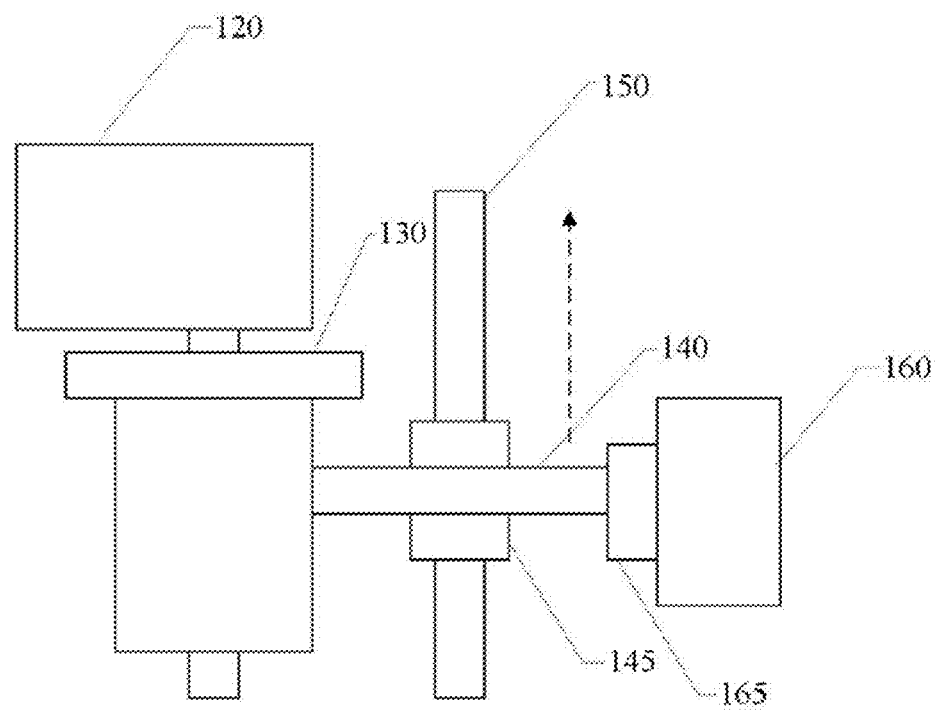

Afterward, referring to FIGS. 4A and 4B, as the first gear set 130 continues driving the second gear 140, and the threads on the surface of the spindle 150 keep matching with the threads of the shaft hole of the rotary shaft 145 of the second gear 140, the linear motion of the second gear 140 along the spindle 150 goes on. Upon reaching the first predetermined position along the spindle 150, the second gear 140 contacts and then engages with the rack 165 of the translation member 160, thus driving the rack 165 to move linearly and perpendicular to the spindle 150. As a result, the translation member 160 on which the rack 165 is provided moves linearly with the rack 165.

Figure 5A:
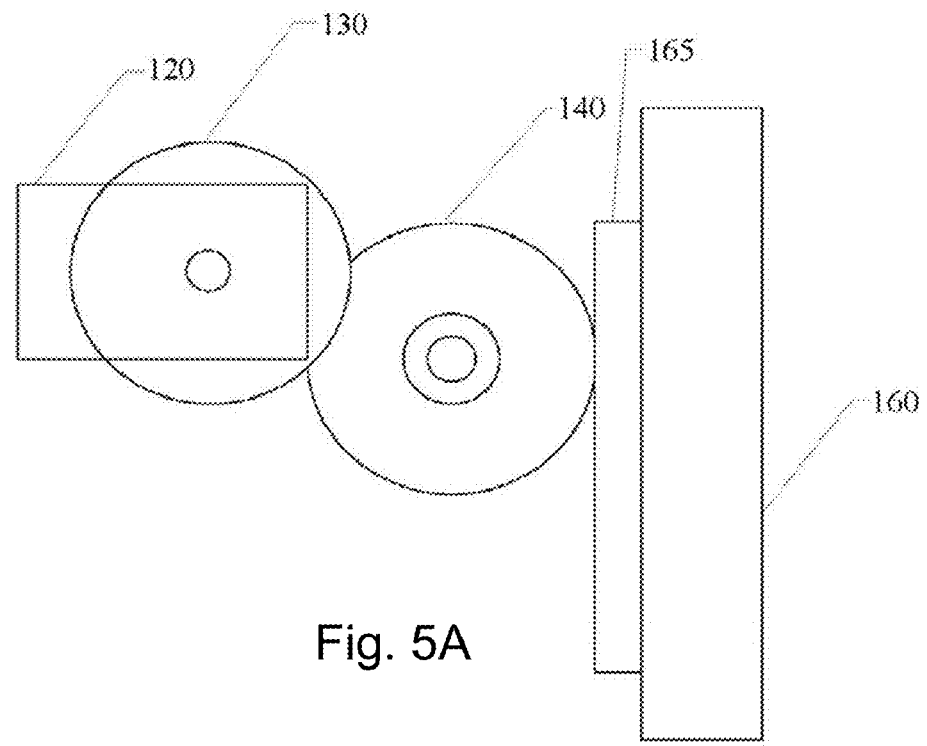
Figure 5B:
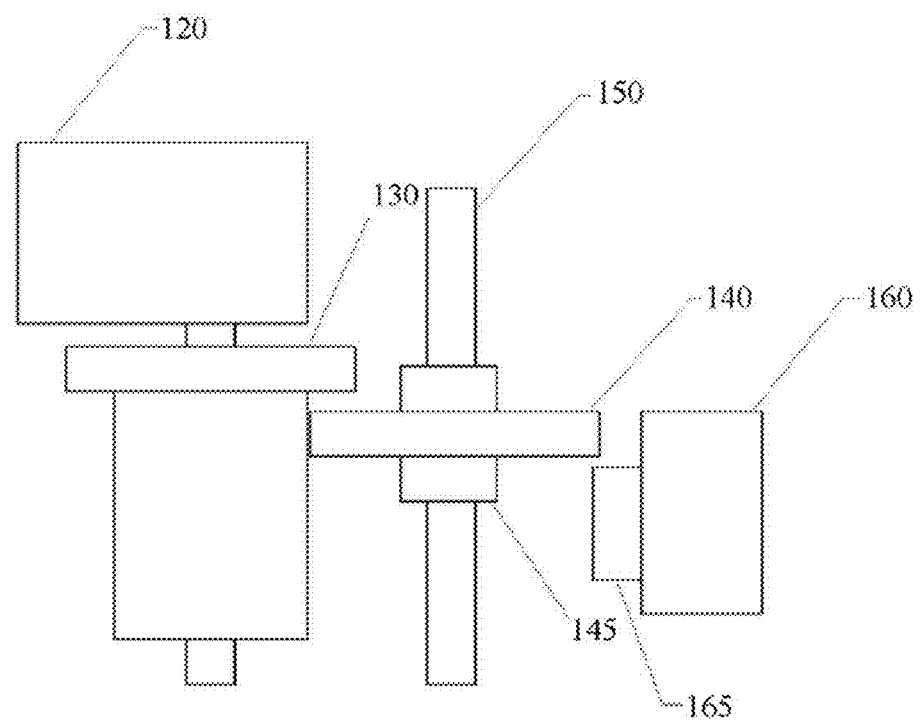

Referring to FIGS. 5A and 5B, the drive motor 120 keeps driving the first reduction gear set 130 to rotate so that the first gear set 130 keeps driving the second gear 140 to rotate as well as to translate linearly along the spindle 150. In the meantime, as the second gear 140 continues driving the rack 165 of the translation member 160, the rack 165 keeps on translating perpendicular to the spindle 150. When the second gear 140 reaches a second predetermined position along the spindle 150, the engagement between the rack 165 and the second gear 140 comes to a final stage. From then on, the second gear 140 gradually disengages from the rack 165 and eventually is disengaged completely therefrom. The rack 165 then stops translation and enters a static state, thus concluding the translation of the translation member 160.

According to the above description, a linear motion controlled and constrained by a driving unit is realized through the relative position between the second gear 140 and the rack 165 of the translation member 160. When the driving unit (i.e., the drive motor 120) is controlled by the control unit 115 to move in a reverse direction, all subsequent motions take place in reverse directions. In so doing, an open-circuit reciprocating mechanism is accomplished, and the intended objectives of the present invention, achieved.

To facilitate engagement between the second gear 140 and the rack 165, the rack 165 may have teeth each formed with rounded upper and lower edges so as to enable smooth engagement. By facilitating the engagement and disengagement between the second gear 140 and the rack 165, the noise, vibration, and wear resulting from such engagement and disengagement are also minimized.

A simple mechanism derived from the inventor's ample experience and ingenious concept is herein provided for fully solving the problems of the prior art, and the inventor believes that the functions of the disclosed subject matter meet the requirement of novelty and non-obviousness for patent application.

While the present invention is demonstrated herein by reference to the preferred embodiment, it is understood that the disclosed embodiment is not to limit the scope of the present invention. Therefore, all equivalent changes or modifications that are based on the appended claims and do not depart from the essence and concept of the present invention should be construed as further embodiments of the present invention.

What is claimed is:

1. A switching mechanism for a camera, comprising:
   a control unit;
   a driving device coupled with and actuated by the control unit;
   a first gear set coupled with the driving device;
   a second gear coupled with the first gear set and being centrally and fixedly provided with a rotary shaft having a shaft hole formed with a plurality of threads;
   a spindle around which the second gear is mounted via spindle being female-connected to the shaft hole of the second gear, the spindle having an axial surface formed with a plurality of outer threads corresponding to the threads of the shaft hole so that the second gear is movable along the spindle; and
   a translation member positioned perpendicular to the spindle and provided with a rack for engaging with the second gear;
   wherein the driving device, when actuated by the control unit, drives the first gear set so that the second gear is driven threadingly by the first gear set to move linearly along the spindle as the threads of the shaft hole of the rotary shaft of the second gear match with the outer threads on the surface of the spindle, through proper spatial arrangement, the second gear, when moved to a first predetermined position along the spindle, engages with the rack of the translation member so that the rack drives the translation member to move perpendicularly to the spindle, wherein the second gear, when further moved to a second predetermined position along the spindle, is disengaged from the rack of the translation member so that the translation member stops moving.

2. The switching mechanism of claim 1, wherein the translation member is coupled with a filter and a glass plate so that, when the translation member is driven by the rack, the filter and the glass plate are moved along with the translation member so as to be adjusted to specific positions.

3. The switching mechanism of claim 2, wherein a lens is disposed in front of the filter or the glass plate, and an image capture device and a printed circuit board are disposed behind the filter or the glass plate.

4. The switching mechanism of claim 3, wherein the image capture device is a CCD sensing element.

5. The switching mechanism of claim 3, wherein the image capture device is a CMOS sensing element.

6. The switching mechanism of claim 1, wherein the driving device is a motor.

7. The switching mechanism of claim 1, wherein the rack of the translation member has a plurality of teeth, each tooth formed with rounded upper and lower edges.

* * * * *